Nov. 17, 1959  B. E. LENEHAN  2,913,667
MULTIELEMENT INDUCTION DEVICE
Filed June 23, 1955  3 Sheets-Sheet 1

WITNESSES
Robert C. Baird
David M. Schiller

INVENTOR
Bernard E. Lenehan.
BY C. L. Freedman
ATTORNEY

Nov. 17, 1959   B. E. LENEHAN   2,913,667
MULTIELEMENT INDUCTION DEVICE
Filed June 23, 1955   3 Sheets-Sheet 2
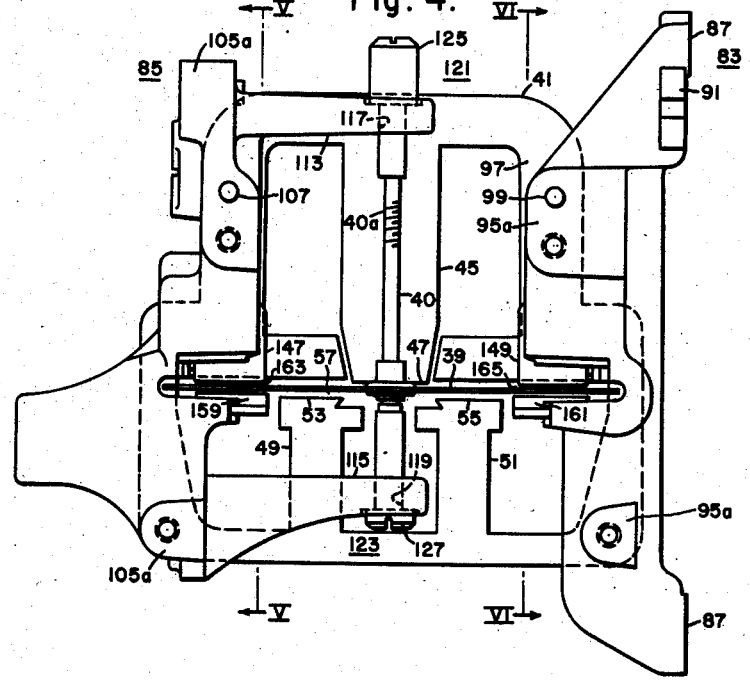
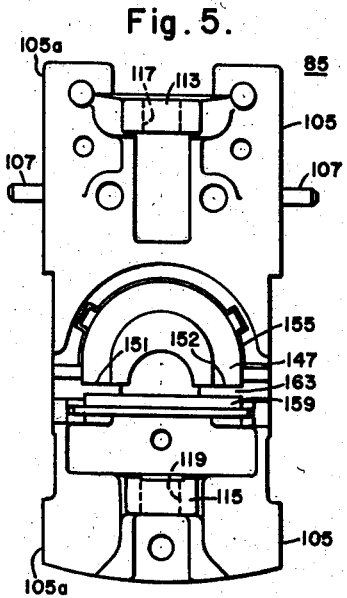
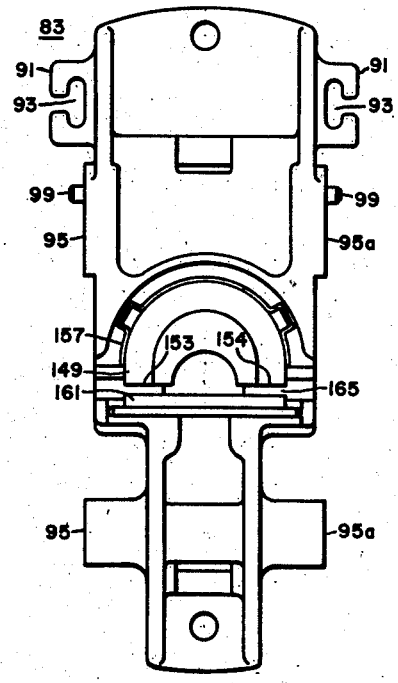

Nov. 17, 1959   B. E. LENEHAN   2,913,667
MULTIELEMENT INDUCTION DEVICE
Filed June 23, 1955   3 Sheets-Sheet 3
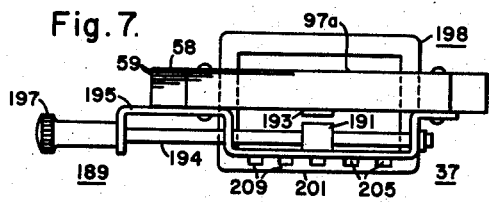
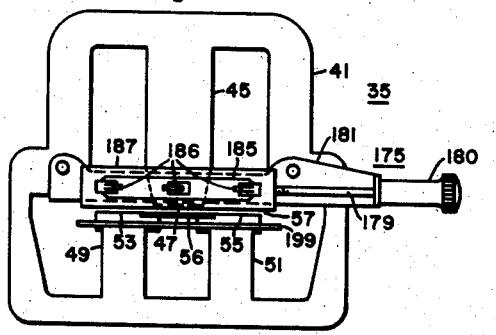
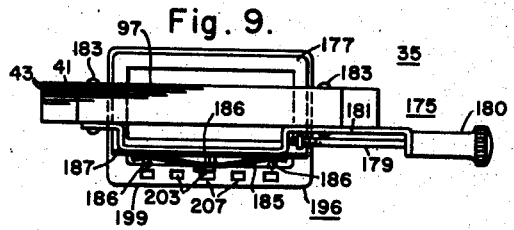
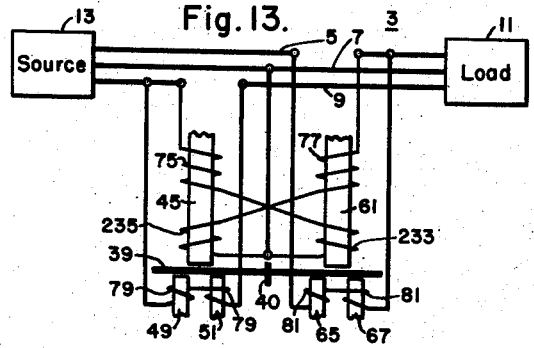
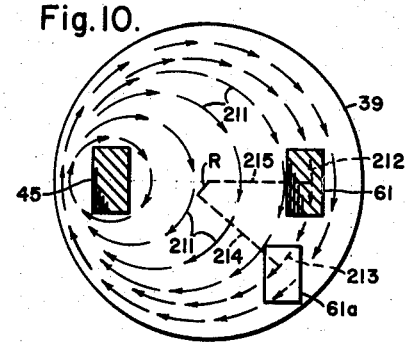
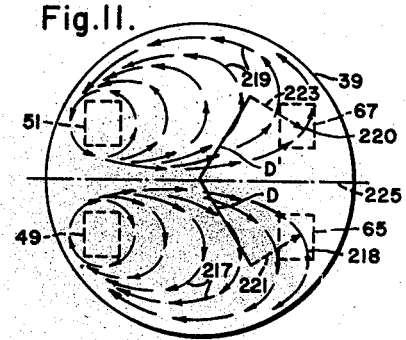
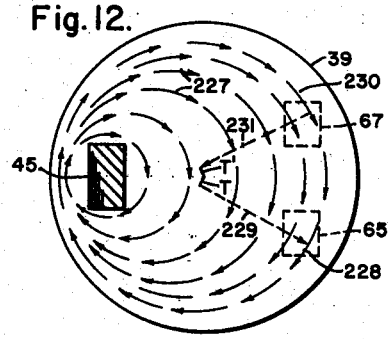
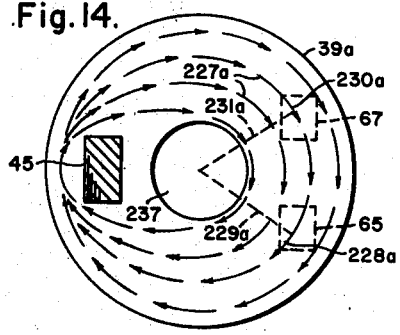

United States Patent Office 2,913,667
Patented Nov. 17, 1959

2,913,667

MULTIELEMENT INDUCTION DEVICE

Bernard E. Lenehan, Bloomfield, N.J., assignor to Westinghouse Electric Corporation, East Pittsburgh, Pa., a corporation of Pennsylvania Application June 23, 1955, Serial No. 517,409

5 Claims. (Cl. 324—137)

This invention relates to multielement induction meters and has particular relation to a two element induction watthour meter such as is employed to measure the energy of polyphase circuits.

In the past, watthour meters have been constructed which include two electromagnetic driving elements positioned to act upon suitable electroconductive armature means. Such armature means have assumed a variety of forms. In order to prevent interference between the two driving elements which adversely affects the response of the meter, such meters have been provided with a pair of armatures with each of the driving elements positioned to influence a separate one of the armatures. The armatures are ordinarily carried by a single shaft in vertical spaced relationship when the meter is in an operative position. Although tending to minimize interference between the elements, such arrangement provides a meter of bulky and expensive structure.

According to the present invention, a multielement induction watthour meter is provided which includes two electromagnetic driving elements positioned to influence a common electroconductive armature with improved means for compensating for certain undesirable interference between the driving elements. The compensating means may be in the form of winding means for each of the driving elements effective when energized to produce currents in the armature which react with magnetic flux of the driving elements to establish compensating torques acting on the armature. The winding means are arranged so that the compensating torques act between the driving elements and the armature in opposition with respect to torques established by certain interference between the elements.

The invention further provides a multielement meter wherein the driving elements are positioned to influence a common armature in such a manner that certain additional interference between the driving elements is substantially eliminated. According to a further aspect of the invention, a multielement meter is provided having operating parts arranged relative to one another so as to provide an assembly of compact and efficient formation.

Multielement watthour meters generally are provided with adjustments for controlling the performance characteristics thereof. For example, one or more phase balance adjustments are ordinarily provided to assure that the driving elements have substantially the same influence upon the associated armature for identical conditions of energization of the elements. Additional adjustments which are employed in single element meters are also utilized in multielement meters. These adjustments include a light load adjustment positioned to operate on one or both of the elements to control the light load response of the meter. Suitable lag adjustments are also provided for the purpose of establishing a desired phase displacement between magnetic fluxes of each of the elements.

According to a further aspect of the invention, a multielement meter is provided which includes two driving elements positioned to influence a common armature with a number of adjustments for controlling the response of the meter which are adjustable from readily accessible positions. According to a preferred embodiment of the invention, the light load and phase balance adjustments are effected from positions at the front area of the instrument when the instrument is in an operative position. The associated lag adjustments are conveniently effected at side areas of the meter when the meter is in an operative position.

It is, therefore, an object of the invention to provide an improved multielement induction meter.

It is another object of the invention to provide a multielement induction meter including two electromagnetic elements positioned to influence a common armature with improved means for compensating for certain undesirable interference between the elements.

It is a further object of the invention to provide a multielement meter including two electromagnetic driving elements positioned to influence a common armature with winding means for the driving elements effective when energized to substantially compensate for certain interference between the elements.

It is another object of the invention to provide a multielement induction watthour meter with an improved arrangement of the operating parts of the meter.

It is a still further object of the invention to provide a multielement induction watthour meter including two electromagnetic driving elements positioned to influence a common armature with an improved arrangement of associated adjustable means provided for controlling the influence of the driving elements upon the armature.

It is still another object of the invention to provide a multielement induction watthour meter including two electromagnetic driving elements positioned to influence a common armature in such a manner as to substantially compensate for certain undesirable interference between the driving elements.

Other objects of the invention will be apparent from the following description, taken in conjunction with the accompanying drawings, in which:

Fig. 4 is a view in side elevation of the meter of Fig. 1 with parts removed;

Fig. 5 is a view in rear elevation of a part of the meter shown in Fig. 4 taken along the line V—V of Fig. 4;

Fig. 6 is a view in front elevation of an additional part of the meter shown in Fig. 4 taken along the line VI—VI of Fig. 4;

Fig. 7 is a view in top plan of a magnetic structure employed in the meter of Fig. 1;

Fig. 8 is a view in side elevation of an additional magnetic structure employed in the meter of Fig. 1;

Fig. 9 is a view in top plan of the structure shown in Fig. 8;

Figs. 10, 11 and 12 are views in top plan of the armature of the meter of Fig. 1 with parts shown diagrammatically illustrating certain electrical quantities present in the meter of Fig. 1;

Fig. 13 is a schematic diagram illustrating circuit connections for the meter of Fig. 1; and Fig. 14 is a view similar to Figs. 10, 11 and 12 illustrating a further embodiment of the invention.

Figure 1:
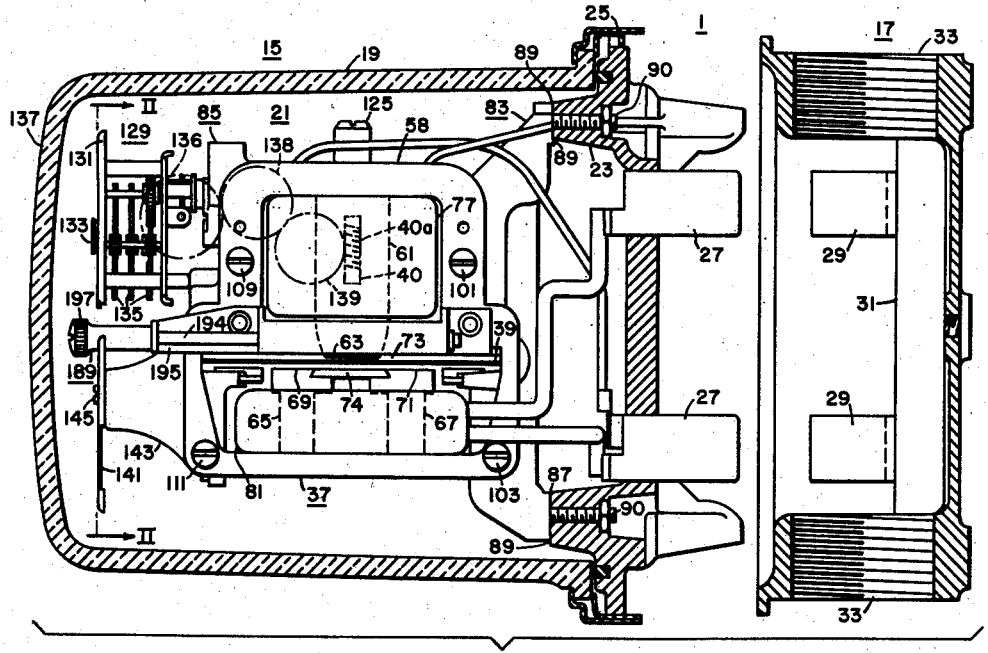
Figure 1 is a view in side elevation with parts shown in section of a detachable type induction meter including cover and socket receptacles embodying the teachings of the invention.

Referring to the drawings, there is illustrated in Fig. 1 a multielement induction meter represented generally by the numeral 1 embodying the teachings of the invention. For purposes of discussion, the meter 1 is assumed to be in the form of a watthour meter effective for measuring the energy of the three-wire circuit 3, as illustrated in Fig. 13. The meter 1, however, may assume other forms such as a relay device.

The circuit 3 of Fig. 13 is assumed to be in the form of a three-wire polyphase circuit having phase conductors 5, 7 and 9 connecting a suitable load 11 for energization from a suitable source of alternating current 13. It will be assumed that the source 13 supplies energy at a frequency of 60 cycles per second. Connections of the meter 1 to the circuit 3 will be described hereinafter.

As illustrated in Fig. 1, the meter 1 is in the form of a detachable meter having a cover receptacle 15 adapted for detachable engagement with a suitable socket receptacle 17. The cover receptacle 15 includes a cover 19 preferably formed of a transparent material, such as glass, which is positioned to surround operating parts 21 of the meter secured to a suitable base plate 23. The cover 19 is secured to the base plate 23 by means of a rim structure 25. The base plate 23 is provided with a plurality of contact blades 27 to which certain of the parts 21 are electrically connected.

The socket receptacle 17 is provided with a plurality of contact jaws 29 which are mounted on an insulating support 31 of the receptacle 17. The receptacle 17 further includes a pair of opposed threaded openings 33 for receiving a suitably threaded conduit (not shown) which houses the conductors 5, 7 and 9 which are electrically connected to the jaws 29. In order to condition the meter 1 for energization, the cover receptacle 15 is positioned relative to the socket receptacle 17 with the contact blades 27 in engagement with the jaws 29. In Fig. 1 the meter 1 is shown in a deenergized condition with the receptacles 17 and 19 detached relative to each other.

Figure 2:
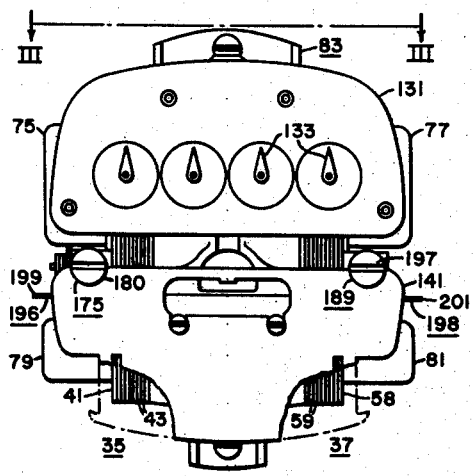
Fig. 2 is a view taken along the line II—II of Fig. 1 with parts removed.
Figure 3:
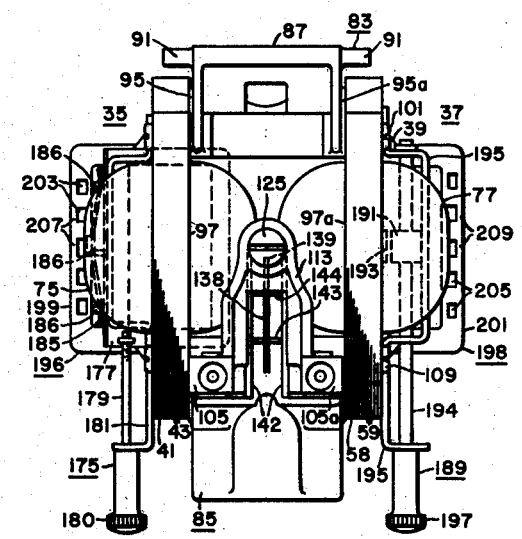
Fig. 3 is a view taken along the line III—III of Fig. 2 with parts removed.

As illustrated in Figs. 2 and 3, the meter 1 includes a pair of electromagnetic driving elements represented generally by the numerals 35 and 37. Each of the elements 35 and 37 is arranged to influence a suitable electroconductive armature illustrated in the form of a disc 39. The disc 39 may be constructed of any suitable electroconductive material, such as aluminum, to present continuous uninterrupted paths to current throughout the entire area of the disc. The disc is mounted for rotation relative to the elements 35 and 37 about an axis by means of a shaft 40. The shaft 40 includes a threaded portion 40a adapted to engage a suitable gear forming part of a coupling means coupling the shaft to a suitable register referred to hereinafter. Details of construction of the elements 35 and 37 are shown in Figs. 1, 7, 8 and 9.

As illustrated in Figs. 8 and 9, the element 35 includes a magnetic structure 41 preferably formed of a plurality of identical magnetic laminations 43, each having the configuration illustrated in Fig. 8. The laminations are preferably formed of a low-loss magnetic material, such as silicon steel. The structure 41 includes a voltage magnetic pole 45 having a pole face 47 and a pair of spaced current magnetic poles 49 and 51 having, respectively, pole faces 53 and 55. The pole faces 53 and 55 are located in a common plane which is spaced from and parallel to the plane defined by the pole face 47 to define an air gap 57. A suitable magnetic shunt 56 may be positioned between the current poles 49 and 51 to provide overload compensation.

The element 37 includes a magnetic structure 58 as shown in Figs. 1 and 7 which may be of identical construction to the magnetic structure 41. As illustrated in Figs. 1 and 7, the structure 58 is formed of magnetic laminations 59 and is provided with a voltage pole 61 having a pole face 63 and a pair of spaced current magnetic poles 65 and 67 having, respectively, pole faces 69 and 71. The poles 61, 65 and 67 define an air gap 73. A magnetic shunt 74 is positioned between the poles 65 and 67 to provide overload compensation.

In order to permit energization of the meter 1, the elements 35 and 37 further include suitable voltage windings 75 and 77 which surround, respectively, the voltage poles 45 and 61. The windings 75 and 77 are preferably formed of a large number of turns of small cross section conductors. The elements 35 and 37 also include, respectively, a pair of current windings 79 positioned to surround the current poles 49 and 51 of the structure 41 and a pair of current windings 81 positioned to surround the current poles 65 and 67 of the structure 58. The windings 79 and 81 are preferably formed of a relatively few number of turns of large cross section conductors as compared to the windings 75 and 77. In order to produce a response representative of energy of the circuit 3, the meter 1 is connected to the circuit 3 as shown in Fig. 13.

For purposes of illustration, the meter 1 is shown in Fig. 13 in diagrammatic form with the current poles 49 and 51 of the structure 41 displaced from the actual positions thereof which is in a common plane extending transverse to the plane of the paper. The current poles 65 and 67 of the structure 58 are similarly displaced. As shown in Fig. 13, the voltage winding 75 is connected for energization from the circuit 3 in accordance with voltage appearing between the phase conductors 7 and 9. The voltage winding 77 is connected between the phase conductors 5 and 7 for energization in accordance with voltage therebetween. The current windings 79 are connected for series energization in accordance with current in the conductor 9 whereas the current windings 81 are connected for series energization in accordance with current in the conductor 5. With such connections, the meter 1 will be energized to produce rotation of the disc 39 in accordance with energy of the circuit 3.

In order to mount the operating parts 21 of the meter in operative positions, a suitable supporting frame assembly is provided. Details of the frame assembly are shown in Figs. 4, 5 and 6. As there shown, the frame assembly is of two-part construction including a rear part 83 and a front part 85. The rear part 83 is adapted to mount the magnetic structures 41 and 58 in a pair of spaced parallel planes which include lines extending between front and rear areas of the meter when the meter is in an operative position as shown in Fig. 1. The part 83 is conveniently carried by the base plate 23 to support the structures 41 and 58.

For this purpose, the part 83 includes spaced rear surfaces 87 adapted for engagement with cooperating surfaces 89 of the base plate 23. The frame part 83 is secured to the plate 23 by suitable securing means 90. Projections 91 having openings 93 extend from opposing side surfaces 95 and 95a of the part 83 for engagement with suitable projections (not shown) of the plate 23.

In order to permit mounting of the structures 41 and 58 to the part 83, the part 83 and the structures 41 and 58 are positioned with the side surfaces 95 and 95a of the part 83 in engagement, respectively, with side surfaces 97 and 97a of the structures 41 and 58. Suitable pins 99 project from the surfaces 95 and 95a to engage openings of the surfaces 97 and 97a. The structures 41 and 58 may be secured to the part 83 in any suitable manner such as by suitable securing means 101 and 103 which extend through a pair of vertically spaced sets of aligned openings of the structures 41 and 58 and of the part 83 as viewed in Fig. 1. With such arrangement, the structures 41 and 58 are mounted in a pair of spaced parallel planes which are transverse to the plane of the base plate 23 with the air gaps 57 and 73 in alignment in a plane transverse to the planes of the structures 41 and 58. It is observed by inspection of Fig. 3 that the frame part 83 is positioned substantially within the space between the structures 41 and 58 at the rear area of the meter.

The frame part 85 is provided for the purposes of mounting other operating parts of the meter 1 in operative positions and to maintain the spacing between the structures 41 and 58 to provide a rigid structure. For these purposes, the frame part 85 is conveniently carried by the magnetic structures 41 and 58 at the front area of the meter as viewed in Fig. 1. To this end, the part 85 includes opposing side surfaces 105 and 105a adapted for engagement with the side surfaces 97 and 97a of the structures 41 and 58. Suitable pins 107 extend from the surfaces 105 and 105a to engage openings of the surfaces 97 and 97a. In order to secure the frame part 85 to the structures 41 and 58, suitable securing means 109 and 111 may be passed through a pair of vertically spaced sets of aligned openings of the structures 41 and 58 and of the part 85 as viewed in Fig. 1. It is observed by inspection of Fig. 3 that the frame part 85 is secured to the structures 41 and 58 substantially within the space therebetween at points which are spaced from the points at which the frame part 83 is secured to the structures 41 and 58.

In order to mount the shaft 40 and the disc 39 for rotation relative to the structures 41 and 58, the frame part 85 is provided with a pair of spaced projections 113 and 115 which extend from a common surface of the part 85 substantially parallel to the side surfaces 105 and 105a. As viewed in Fig. 4, the projections 113 and 115 are spaced in the vertical direction to project from the rear of the part 85 toward the front of the part 83. The projections 113 and 115 have suitable openings 117 and 119 in vertical alignment as viewed in Figs. 4 and 5.

Suitable upper and lower bearing assemblies 121 and 123 are supported respectively by the projections 113 and 115 to mount the shaft 40 for rotation about the vertical axis. The projections 113 and 115 are proportioned to mount the disc 39 for rotation through the aligned air gaps 57 and 73 of the structures 41 and 58.

The frame parts 83 and 85 may be constructed of any suitable material. Preferably, the parts 83 and 85 are constructed of a non-magnetic electroconductive die casting material such as an aluminum die casting alloy which may be cast to provide parts 83 and 85 of the desired configuration. Such die casting material being electroconductive offers shielding against external electromagnetic fields. Since the parts 83 and 85 may be cast separately from other parts of the meter 1, a material may be employed which has a substantial melting temperature such as a temperature of the order of 500° C. or higher. The material of the parts 83 and 85 may thus be selected to provide certain desired properties such as physical, electrical and chemical properties without fear that the temperatures required will interfere with other operations or components of the meter 1. The melting temperature of a suitable aluminum base die casting material is approximately 600° C. Further details of the construction of the supporting frame assembly may be found in application Serial No. 517,513, filed June 23, 1955, by James M. Wallace and assigned to the assignee of the present invention.

In order to provide a visual indication of the amount of energy consumed by the load device 11, a suitable register assembly 129 is provided. The register assembly 129 includes a dial plate 131 over which a plurality of pointers 133 pass in response to actuation thereof by suitable gearing 135. The gearing 135 is actuated in turn from the shaft 40 by intermediate coupling gears 136, 138 and 139.

According to the invention, the assembly 129 is mounted at the front area of the meter spaced from the shaft 40 along a direct path which is unobstructed by the structures 41 and 58. To this end, the assembly 129 is secured to front surfaces of the frame part 85 in any suitable manner. With such arrangement, the dial plate 131 is located adjacent the front 137 of the cover or permit inspection of the plate 131. Furthermore, such arrangement provides an unobstructed region between the assembly 129 and the shaft 40 for accommodating the coupling gears 136, 138 and 139. A suitable information bearing plate 141 is conveniently carried by the frame part 85 beneath the plate 131 in vertical alignment therewith as viewed in Fig. 1. Plate 141 may be secured to 85 by screws 145.

In order to maintain positive coupling between the register assembly 129 and the shaft 40, the coupling gears 136, 138 and 139 are supported by the frame part 85 which also supports the assembly 129 and the shaft 40. For this purpose, a pair of supporting plates 142 are secured to the part 85 in spaced parallel relation as viewed in Fig. 3. The gears 138 and 139 are secured to suitable shafts 143 and 144, respectively, which are carried by the plates 142 for rotation relative to the plates 142. The gear 136 may be secured to the assembly 129.

For the purpose of damping rotation of the disc 39, one or more permanent magnets may be positioned to influence the disc 39. Preferably, two permanent magnets 147 and 149 are provided for positioning at diametrically opposed areas of the disc 39. As illustrated in Figs. 4, 5 and 6, the magnets 147 and 149 are of identical construction each having a substantially U-shaped configuration. The magnet 147 has a pair of opposed poles 151 and 152 with pole faces aligned in a common plane and the magnet 149 similarly has a pair of opposed poles 153 and 154 with pole faces positioned in a common plane.

The magnets 147 and 149 may be constructed of any suitable magnetic material. Preferably, the magnets are constructed of a high coercive magnetic material, a number of which are commercially available. For example, high cobalt permanent magnet steel, such as one containing 36% by weight of cobalt, is available. Preferably, a high coercive material such as Alnico is employed in the construction of the magnets. Such high coercive alloys have good resistance to demagnetization.

In order to permit mounting of the magnets 147 and 149 in operative positions, the frame parts 85 and 83 are provided, respectively, with pockets 155 and 157 having open ends as viewed in Figs. 5 and 6. The pockets 155 and 157 are proportioned to receive the magnets through the open ends thereof to position the magnets in a pair of spaced parallel planes extending transverse to the planes of the structures 41 and 58 with the poles 151, 152, 153 and 154 located on a common side of the disc 39 when the frame parts 83 and 85 are in operative positions. The magnets 147 and 149 may be secured within the pockets 155 and 157 in any suitable manner.

The magnets 147 and 149 are preferably secured to the frame parts 83 and 85 in the manner described in application Serial No. 437,030, filed June 16, 1954, by F. W. Witte and assigned to the assignee of the present invention. According to such arrangement, the magnets 147 and 149 are proportioned for positioning within the pockets 155 and 157 with clearance between the peripheral surfaces of the magnets and the side walls of the pockets. Suitable securing means may then be positioned within the pockets between the peripheral surfaces of the magnets and the side walls of the pockets to secure the magnets to the associated frame parts within the pockets. According to the above-referred-to application, the securing means is in the form of a hardenable fluid material which is introduced into the pockets subsequent to positioning of the magnets therein.

In order to complete the magnetic circuits for the magnets 147 and 149, a separate magnetic member is positioned beneath each of the magnets to provide paths for magnetic flux emanating from the magnets. As shown in Figs. 4, 5 and 6, suitable magnetic bars 159 and 161 are positioned, respectively, beneath the magnets 147 and 149 to define with the poles 151 and 152 and with the poles 153 and 154 air gaps 163 and 165. The magnetic bars 159 and 161 may also be carried by the frame parts 83 and 85 to provide air gaps 163 and 165 which are aligned in a plane transverse to the axis of rotation of the disc 39 to permit rotation of the disc 39 therethrough.

With the above-described construction, it is observed that the magnets 147 and 149 are effectively shielded against external magnetic fields by means of the frame parts 83 and 85 and the structures 41 and 58. It is observed with reference to Figs. 3 and 4 that the magnets 147 and 149 are positioned in an area which is surrounded by the opposed structures 41 and 58 and the opposed frame parts 83 and 85.

In order to control the influence of the elements 35 and 37 upon the disc 39, suitable adjustments are provided. For this purpose, suitable light load adjusting means 175 is provided to control the response of the meter 1 to light load conditions of the circuit 3. The adjusting means 175 may be associated with one or both of the elements 35 and 37. Details of construction of the adjusting means 175 is illustrated in Figs. 8 and 9.

As there shown, the adjusting means 175 is associated only with the element 35 and includes an electroconductive member 177 positioned beneath the voltage pole 45 of the structure 41 in the path of the voltage flux to intercept a portion of the voltage flux. The member 177 is shown in the form of a closed loop effective to lag a portion of the voltage flux to develop a torque which is applied to the disc 39. For the purpose of providing a variable torque, the member 177 is mounted for adjustment relative to the pole 45 to intercept a variable portion of the voltage flux. To this end, a suitable actuating mechanism is provided which is actuable to effect movement of the member 177 relative to the pole 45 along an axis extending parallel to the plane of the structure 41 and to the plane of the pole face 47.

According to the present invention, the adjusting means 175 is adjustable from the front area of the meter 1 when the structure 41 is in an operative position to effect movement of the member 177. The adjusting means 175 is also positioned at a side of the structure 41 which is opposite to the side thereof containing the shaft 40.

For this purpose, the actuating mechanism includes a screw member 179 which is mounted in threaded engagement with a portion of the member 177 for rotation relative to the member 177 about an axis extending parallel to the plane of the structure 41. The member 179 is mounted at a side of the structure 41 with an actuable end portion 180 thereof projecting beyond an end of the structure 41. As illustrated in Fig. 9, a suitable bracket 181 is secured to the structure 41 for supporting the member 179 for rotation. The bracket 181 carries a suitable spring member 185 supported by projections 186 of the bracket 181. The member 185 engages a portion of the member 177 to mount the member 177 to the bracket 181 for movement relative to the structure 41. Further details of the construction of light load adjusting means may be found in application Serial No. 465,162, filed October 28, 1954, by F. V. Kadri and assigned to the assignee of the present invention, now Patent No. 2,832,048, dated April 22, 1958.

In order to cause the elements 35 and 37 to apply substantially equal torques to the disc 39 for identical conditions of energization of the elements 35 and 37, suitable phase balance adjusting means is provided for adjusting the torque applied by one or both of the elements. As illustrated in Fig. 7, phase balance adjusting means 189 is associated with the structure 58 of the element 37 to control the torque applied by the element 37.

As illustrated in Fig. 7, the adjusting means 189 includes a shunt magnetic path having an adjustable portion adjustable for diverting a variable portion of the voltage flux of the structure 58 away from the air gap 73 through the shunt path. To this end, a magnetic block 191 is mounted adjacent the air gap 73 for movement relative to the voltage pole 61 along an axis extending parallel to the plane of the structure 58 and to the plane of the pole face 63. A suitable magnetic projection 193 forming part of the shunt path may be secured to a side of the pole 61 to extend toward the block 191.

In accordance with the present invention, the adjusting means 189 is adjustable from the front area of the meter 1 when the structure 58 is in an operative position. The adjusting means 189 is further positioned at a side of the structure 58, which is opposite to the side thereof containing the shaft 40.

To this end, a suitable non-magnetic screw member 194 is carried by a magnetic bracket 195 constituting the main portion of the shunt path in threaded engagement with the block 191 for rotation relative to the block 191. The member 194 is mounted at a side of the structure 58 for rotation about an axis extending parallel to the plane of the structure 58. The member 194 includes an actuable end portion 197 which projects beyond an end of the structure 58. Further details of the construction of phase balance adjusting means may be found in application Serial No. 517,595, filed June 23, 1955, by W. J. Schmidt and assigned to the assignee of the present invention, now Patent No. 2,871,421, dated January 27, 1959.

When the structures 41 and 58 are energized, it is desirable that the voltage and current fluxes of each of the structures 41 and 58 have a predetermined phase relationship. This relationship should be such that at unity power factor of the load 11, the voltage and current fluxes have a quadrature relationship. In order to establish such phase relationship, separate lag adjusting means is associated with each of the elements 35 and 37.

As illustrated in Figs. 7 and 9, the lag adjusting means 196 and 198 are associated respectively with the structures 41 and 58. The adjusting means 196 and 198 include, respectively, electroconductive members 199 and 201 in the form of closed loops each positioned to link magnetic flux produced by a separate one of the magnetic structures 41 and 58. The members 199 and 201 are preferably positioned to surround respectively the current poles 49 and 51 of the structure 41 and the current poles 65 and 67 of the structure 58 to intercept the voltage flux of the poles 45 and 61.

In order to permit adjustment of the adjusting means 196 and 198 to establish a desired phase relationship between the magnetic fluxes of the elements 35 and 37 at a predetermined power factor of the load 11, the members 199 and 201 are provided respectively with a plurality of spaced openings 203 and 205 which define weakened sections 207 and 209 of the members 199 and 201. By effecting severance of the sections 207 and 209, the electrical resistance of the members 199 and 201 may be varied to thereby adjust the lag effect thereof. Further details of the construction of flux lagging members may be found in application Serial No. 419,972, filed March 31, 1954, by A. J. Petzinger and assigned to the assignee of the present invention.

In accordance with the invention, the adjusting means 196 and 198 are adjustable from sides of the magnetic structures 41 and 58 which are opposite to sides thereof which contain the shaft 40. For this purpose, the members 199 and 201 are positioned in planes extending transverse to the planes of the structures 41 and 58 with the severable portions 207 and 209 spaced from the magnetic structures at sides thereof for severance by cutting action along axes extending transverse to the planes of the structures 41 and 58 toward the structures.

In induction watthour meters which include two electromagnetic elements acting upon a common electroconductive armature, certain interference between the elements may exist. Such interference may result in the establishment of a number of undesirable torques acting between the elements and the armature which adversely affect the response of the meter. Such interference is of three general types which are described hereinafter.

A first type of interference involves a reaction between current in the associated armature which is produced by the voltage flux of one element and the voltage flux produced by the other element. This type of interference also involves an additional similar reaction between current in the armature produced by voltage flux of the other element and the voltage flux of the one element. This type of interference will be referred to hereinafter as voltage interference and will be described with reference to Fig. 10. Inasmuch as the two interactions which constitute the voltage interference are identical in nature, only one of these interactions will be described.

With reference to Fig. 10, there is diagrammatically shown the voltage poles 45 and 61 positioned to influence the disc 39. When the pole 45 is energized, the voltage flux produced thereby will cut the disc 39 to induce voltages in the disc which direct currents about the disc. Such currents are represented in Fig. 10 by the curved lines 211 and have instantaneous directions of flow as indicated by the associated arrows. It is observed that a portion of the current 211 traverses the disc in the vicinity of the voltage pole 61. This current portion is represented by the dotted line 212 in Fig. 10. The current portion 212 will react with the flux of the voltage pole 61 to establish a force which acts between the pole 61 and the disc 39 along an axis extending transverse to the path of flux of the pole 61 through the disc and to the path of the current portion 212. The instantaneous direction of this force is dependent upon the instantaneous directions of flux from the pole 61 and the current portion 212. The magnitude of the established force is dependent upon the effective value of the current portion 212, the effective value of the flux from the pole 61 and the phase relationship between such current and flux.

For purposes of explanation, let it be assumed that a voltage pole 61a is substituted for the pole 61 having a position as shown in Fig. 10. The portion of the current 211 in the vicinity of the pole 61a is represented by the dotted line 213. The current portion 213 and flux from the pole 61a follow paths such that the reaction between such current portion and flux establishes a force which acts between the pole 61a and the disc 39 along an axis represented by the dotted line 214. It is observed that the axis 214 passes through a point which is displaced from the center of the disc 39 by a distance R. Consequently, such established force tends to effect rotation of the disc in a direction dependent upon the direction of the force. It may be shown in a similar manner that a force is established acting between the pole 45 and the disc 39 by a reaction between flux of the pole 45 and currents produced in the disc 39 by action of flux of the pole 61a.

In order to substantially eliminate voltage interference and the resultant adverse forces established thereby, the invention provides that the elements 35 and 37 of the meter 1 be positioned relative to the disc 39 with the voltage poles 45 and 61 located at areas spaced along an axis extending through the center of the disc 39 parallel to the plane of the disc. Preferably, the poles 45 and 61 are positioned at diametrically opposed areas of the disc 39 as illustrated in Fig. 10. It is observed that with such positioning of the poles 45 and 61, the current portion 212 follows a path such that the reaction between such current portion and flux of the pole 61 establishes a force which acts along an axis represented by the dotted line 215 which passes through the center of the disc 39. Consequently, with the poles 45 and 61 positioned as in Fig. 10 there is no tendency for rotation of the disc 39 as a result of such force. It may be shown in a similar manner that the arrangement of the poles 45 and 61 in accordance with the invention is also effective to eliminate the undesirable effect of the force resulting from a reaction between current in the disc produced by the flux of pole 61 and flux produced by pole 45.

The second type of interference between the elements 35 and 37 involves a reaction between current in the disc 39 produced by the current flux of one element and the current flux of the other element. The second type of interference also involves an additional reaction between current in the disc produced by current flux of the other element and the current flux of the one element. This second type of interference will be referred to hereinafter as current interference and will be described with reference to Fig. 11. Since the two reactions which constitute current interference are identical in nature, only one of these reactions will be described.

With reference to Fig. 11, there is diagrammatically shown the current poles 49 and 51 of the element 35 and the current poles 65 and 67 of the element 37 positioned to influence the disc 39. When the poles 49 and 51 are energized, flux produced thereby will have opposing instantaneous directions of flow in the poles 49 and 51. The flux of the pole 49 is effective to establish currents in the disc which are represented by the curved lines 217 and which have instantaneous directions of flow as indicated by the associated arrows. It is observed that the currents 217 are confined to the lower half of the disc as viewed in Fig. 11 to extend into the region of the disc adjacent the pole 65. The portion of the currents 217 in the vicinity of the pole 65 is represented by the line 218 in Fig. 11.

In a similar manner, flux of the pole 51 establishes currents in the disc 39 which are represented by the curved lines 219 and which have instantaneous directions of flow as indicated by the associated arrows. The currents 219 are confined to the upper half of the disc 39 as viewed in Fig. 11 to extend into the region of the disc adjacent the pole 67. The portion of the currents 219 in the region of the pole 67 is represented by the line 220.

The current portion 218 will react with flux of the pole 65 to establish a force which acts between the disc 39 and the pole 65. Similarly, the current portion 220 will react with flux of the pole 67 to establish a force acting between the pole 67 and the disc 39. The current portions 218 and 220 and the flux of the poles 65 and 67 cutting the disc 39 flow along paths such that the forces established act along axes represented by the dotted lines 221 and 223. It is observed that the axes 221 and 223 pass through points which are displaced from the center of the disc 39 by distances D and D', respectively. Consequently, the forces acting along the axes 221 and 223 each tend to produce rotation of the disc 39. It may be shown in a similar manner that forces are established acting between the poles 49 and 51 and the disc 39 by reactions between flux of the poles 49 and 51 and currents in the disc produced by flux of the poles 65 and 67.

According to the present invention, the elements 35 and 37 of the meter 1 are arranged in such a manner with respect to the disc 39 that undesirable forces produced by current interference are substantially equal in magnitude and tend to rotate the disc in opposing directions relative to each other. For this purpose, the elements 35 and 37 are positioned such that the current poles 51 and 67 are symmetrically located relative to the current poles 49 and 65 with respect to an axis represented by the dotted line 225 which is parallel to the plane of the disc 39 and which passes through the center of the disc as shown in Fig. 11. The invention may be explained as follows.

Inasmuch as fluxes of the poles 49 and 51 which cut the disc 39 are substantially equal and since the poles 51 and 67 are positioned symmetrically with respect to the poles 49 and 65, the current portions 218 and 220 will have substantially the same magnitude. Since the fluxes of the poles 65 and 67 which react with the current portions 218 and 220 also are substantially equal, the forces produced by such reactions will, therefore, be substantially equal. With the symmetrical arrangement as illustrated in Fig. 11, the distances D and D' will also be equal. Consequently, since the magnetic fluxes of the poles 65 and 67 have opposing instantaneous directions in the poles 65 and 67, the established forces have instantaneous directions as indicated by arrows associated with the lines 221 and 223 tending to rotate the disc 39 in opposing directions relative to each other. It may be shown in a similar manner that the arrangement of the poles 49, 51, 65 and 67 in accordance with the invention is also effective to eliminate the undesirable effect of forces established by reactions between currents in the disc 39 produced by flux of the poles 65 and 67 and flux of the poles 49 and 51.

A third type of interference between the elements 35 and 37 involves a reaction between current in the disc 39 produced by the voltage flux of one element and the current flux of the other element. Such interference also involves an additional reaction between current in the disc produced by voltage flux of the other element and current flux of the one element. This type of interference will be referred to hereinafter as voltage-current interference and will be described with reference to Fig. 12. Since the two interactions constituting voltage-current interference are identical in nature, only one of these reactions will be described.

With reference to Fig. 12, there is diagrammatically shown the voltage pole 45 of the element 35 and the current poles 65 and 67 of the element 37 positioned to influence the disc 39. When the pole 45 is energized, the flux produced thereby will establish currents in the disc which are represented in Fig. 12 by curved lines 227 and which have instantaneous directions of flow as indicated by associated arrows. A portion of the current 227 extends into areas of the disc 39 adjacent the poles 65 and 67. The portion of the current 227 in the vicinity of the pole 65 is represented by the line 228 in Fig. 12. The current portion 228 reacts with the flux of the pole 65 to establish a force which acts along an axis represented by the dotted line 229 between the pole 65 and the disc 39. The portion of the current 227 in the vicinity of the pole 67 is represented by the line 230 in Fig. 12. The current portion 230 reacts with flux of the pole 67 to establish a force acting along an axis represented by the dotted line 231 between the pole 67 and the disc 39.

It is observed that with the poles 65 and 67 positioned in accordance with the invention of Fig. 11, the axes 229 and 231 of Fig. 12 pass through points which are displaced from the center of the disc 39 by the distances T and T', respectively. Consequently, the forces acting along the lines 229 and 231 tend to effect rotation of the disc. If it be assumed that the fluxes of the poles 65 and 67 have instantaneous directions of flow in the poles 65 and 67 which are respectively away from and toward the observer, then the established forces will have instantaneous directions as indicated by the arrows associated with the lines 229 and 231, thereby tending to rotate the disc in a common direction which is counterclockwise as viewed in Fig. 12. It may be shown in a similar manner that undesirable forces are also established by reaction between currents in the disc produced by the voltage pole 61 and current flux of the current poles 49 and 51 which act between the poles 49 and 51 and the disc 39.

In accordance with the invention, the meter 1 is provided with means for producing torques acting between the disc 39 and the elements 35 and 37 effective to compensate for torques established by voltage-current interference as previously described. Such compensating means are effective to establish torques which act on the disc in opposite directions relative to the interference torques and which have substantially the same magnitude as the interference torques. The compensating torques are established by suitable alternating magnetic flux producing means effective to establish compensating currents in the disc 39 which react with magnetic flux of the meter 1.

According to a preferred embodiment of the invention, the compensating means includes a winding 233 positioned to surround the voltage pole 61 for producing when energized magnetic flux which establishes compensating currents in the disc which react with magnetic flux produced by energization of the current windings 81 of the current poles 65 and 67. The winding 233 is arranged to establish compensating torques acting between the poles 65 and 67 and the disc 39 which tend to rotate the disc in a direction opposite from the direction in which the torques established by voltage-current interference tend to rotate the disc.

The winding 233 may be energized in any suitable manner. Preferably, the winding 233 is connected for energization in accordance with voltage appearing between the phase conductors 7 and 9 as shown in Fig. 13. To this end, the winding 233 is conveniently connected in series circuit relation with respect to the voltage winding 75 of the voltage pole 45. The winding 233 is wound with respect to the winding 75 so as to establish compensating torques which act on the disc 39 in opposition with respect to the torques produced by voltage-current interference. Such arrangement is further effective to provide compensation for any phase relationship between the voltages appearing between the conductors 5 and 7 and the conductors 7 and 9.

In order to provide effective compensation, the magnitudes of the compensating torques produced by energization of the winding 233 should be substantially the same as the magnitudes of the torques established by reaction of the current portions 228 and 230 with current flux of the poles 65 and 67. It has been observed that the magnitudes of the current portions 228 and 230 are within the range of .005 to .05 of the magnitude of the portion of the current 227 in the region of the disc 39 adjacent the voltage pole 45. The exact figure is dependent upon the size and material of the disc 39. In a specific application of the invention, this figure was found to be approximately .02. Consequently, by providing the winding 233 with a number of turns equal to approximately .02 of the number of turns of the winding 75, the magnitudes of the compensating torques produced by energization of the winding 233 is substantially equal to the magnitudes of the torques established by reaction of the current portions 228 and 230 with current flux of the poles 65 and 67.

It is understood that compensation may be similarly provided for interference torques established by reaction between currents in the disc 39 established by magnetic flux produced by the winding 77 of the voltage pole 61 and magnetic flux produced by the windings 79 of the current poles 49 and 51. To this end, a winding 235 is positioned to surround the voltage pole 45 in the same manner as described in connection with the winding 233. The winding 235 may be similarly connected in series circuit relationship with respect to the voltage winding 77 and may have a number of turns equal to approximately .02 of the number of turns of the winding 77.

Compensating currents established in the disc 39 by energization of the winding 233 include portions which traverse the disc in the region of the magnetic structure 41. These portions react with magnetic flux of the structure 41 to establish torques acting between the structure 41 and the disc. Similarly, portions of the compensating currents established in the disc 39 by energization of the winding 235 follow paths in the disc in the vicinity of the structure 58 to produce torques acting between the structure 58 and the disc. It has been observed, however, that the magnitudes of these torques are extremely small and that the effects of such torques upon the performance of the meter may be disregarded for practical purposes.

In the embodiment of the invention of Fig. 14, there is illustrated a different arrangement for compensating for undesirable torques established by voltage-current interference. As diagrammatically shown in Fig. 14, the poles 45, 65 and 67 are positioned to influence an electroconductive armature 39a which is of different construction than the disc 39. According to the invention, the armature 39a is in the form of a disc having a centrally located insulating portion 237. The portion 237 may be in the form of an opening of the disc 39a. Preferably, however, the portion 237 is in the form of insulating material filling an opening of the disc 39a to facilitate the securement of a shaft, such as the shaft 40, to the disc 39a.

It will be recalled in connection with Fig. 12 that when the voltage winding 75 is energized, magnetic flux produced thereby creates currents 227 in the disc 39 having portions 228 and 230 in the disc adjacent the poles 65 and 67 which react with magnetic flux of the poles 65 and 67 to establish two forces tending to rotate the disc in a common direction. It is also recalled that these forces act along axes represented by the lines 229 and 231 of Fig. 12. In Fig. 14, currents established in the disc 39a by energization of the winding 75 of the pole 45 are represented by the curved lines 227a and have instantaneous directions of flow as indicated by the arrows associated with such lines. The currents 227a have portions 228a and 230a which are effective to establish two forces acting between the poles 65 and 67 and the disc 39a along axes represented by the dotted lines 229a and 231a.

It is observed in Fig. 14 that the lines 229a and 231a passes through the center of the disc 39a. Consequently, the forces acting along such lines are ineffective to cause rotation of the disc 39a. According to the present understanding of the invention, the portion 237 is effective to divert the currents 227a toward the periphery of the disc 39a in such a pattern that the current portions 228a and 230a adjacent the poles 65 and 67 follow paths extending substantially transverse to axes included in the disc which extend through the center of the disc. Such axes coincide with the axes represented by the lines 229a and 231a along which the forces established by voltage-current interference extend. It may be shown in a similar manner that the portion 237 is effective to cause forces established by reactions between current in the disc produced by energization of the winding 77 of the pole 61 and current magnetic flux of the poles 49 and 51 to act along axes which extend through the center of the disc.

If desired, the compensation described in connection with Fig. 14 may be employed with the windings 233 and 235 to provide very effective compensation for voltage-current interference. When a disc similar to the disc 39a of Fig. 14 is employed in the meter 1, it is observed that the magnitudes of the curent portions 228a and 230a are approximately .009 of the magnitude of the current 227a in the region of the disc adjacent the pole 45. Consequently, when the windings 233 and 235 are utilized with a disc similar to the disc 39a, effective compensation is afforded by providing the windings 233 and 235 with a number of turns equal to approximately .009 of the number of turns of the windings 75 and 77 respectively.

By means of the invention, a watthour meter including two electromagnetic elements acting on a common armature is provided which is fully compensated for undesirable torques acting on the armature produced by interference between the two elements. In addition, the magnetic structures 41 and 58 are positioned in such a manner to assist in providing such compensation and to further provide an extremely compact meter structure. Furthermore, adjustments which are employed for controlling the response of the meter are located for adjustment from readily accessible positions.

Although the invention has been described with reference to certain specific embodiments thereof, numerous modifications are possible, and it is desired to cover all modifications falling within the spirit and scope of the invention.

I claim as my invention:

1. In a multielement induction meter, a pair of electromagnetic elements, each of said elements including a magnetic structure having a air gap, and winding means for the magnetic structure, said winding means being effective when energized for establishing a shifting magnetic field in the air gap; said magnetic structures being positioned in a pair of spaced parallel first planes with said air gaps in alignment in a second plane transverse to the first planes, an electroconductive armature mounted for rotation about a first axis extending substantially transverse to the second plane relative to the magnetic structures through the aligned air gaps under the influence of the shifting magnetic fields, said first axis being located in the space between said magnetic structures, each of said first planes extending between front and rear areas of the meter, light load adjusting means operating on one of said elements for controlling the light load response of the meter, phase balance adjusting means operating on the other of said elements for controlling the influence of said other of said elements upon the armature to provide substantially the same influence of said elements upon the armature for equal energizations of said elements, and separate rotatable means for adjusting each of said adjusting means, said rotatable means being mounted for rotation relative to said structures about spaced second axes extending parallel to said first planes and transverse to said first axis, said second axes being located on sides of said magnetic structures opposite to the sides thereof which contain said first axis, each of said rotatable means including an actuable portion located at said front area.

2. In a multielement induction meter, a pair of electromagnetic elements, each of said elements including a magnetic structure having a air gap, and winding means for the magnetic structure, said winding means being effective when energized for establishing a shifting magnetic field in the air gap; said magnetic structures being positioned in a pair of spaced parallel first planes with said air gaps in alignment in a second plane transverse to the first planes; an electroconductive armature mounted for rotation about a first axis extending substantially transverse to the second plane relative to the magnetic structures through the aligned air gaps under the influence of the shifting magnetic fields, said first axis being located in the space between said magnetic structures, each of said first planes extending between front and rear areas of the meter, light load adjusting means operating on one of said elements for controlling the light load response of the meter, phase balance adjusting means operating on the other of said elements for controlling the influence of said other of said elements upon the armature to provide substantially the same influence of said elements upon the armature for equal energizations of said elements, separate rotatable means each having an actuable portion for adjusting each of said adjusting means, said rotatable means being mounted with said actuable portions at said front area for rotation relative to the structures about spaced second axes extending parallel to said first planes and transverse to said first axis, said second axes being located on sides of said magnetic structures opposite to the sides thereof which contain said first axis, and separate lag adjusting means for controlling the phase displacement between the magnetic fluxes of each of said elements, said lag adjusting means being adjustable by operations performed at sides of said magnetic structures which contain said second axes.

3. In a multielement induction meter, a pair of electromagnetic elements, each of said elements including a magnetic structure having an air gap, and winding means for the magnetic structure, said winding means being effective when energized for establishing a shifting magnetic field in the air gap; said magnetic structures being positioned in a pair of spaced parallel first planes with said air gaps in alignment in a second plane transverse to the first planes, an electroconductive armature mounted for rotation about a first axis extending substantially transverse to the second plane relative to the magnetic structures through the aligned air gaps under the influence of the shifting magnetic fields, said first axis being located in the space between said magnetic structures, each of said first planes extending between front and rear areas of the meter, a pair of substantially U-shaped permanent magnets each having a pair of magnetically opposed poles for damping rotation of said armature, supporting frame means supporting said magnets in the space between the magnetic structures in a pair of spaced parallel third planes transverse to said first planes with said opposed poles on a common side of the armature, said magnets being located in an area which is bounded by said magnetic structures and said frame means, said frame means being formed of an electroconductive non-magnetic material, light load adjusting means operating on one of said elements for controlling the light load response of the meter, phase balance adjusting means operating on the other of said elements for controlling the influence of said other of said elements upon the armature to provide substantially the same influence of said elements upon the armature for equal energizations of said elements, and separate rotatable means for adjusting each of said adjusting means, said rotatable means being mounted for rotation relative to said structures about spaced second axes extending parallel to said first planes and transverse to said first axis, said second axes being located on sides of said magnetic structures opposite to the sides thereof which contain said first axis, each of said rotatable means including an actuable portion located at said front area.

4. In a multielement induction meter, a pair of electromagnetic elements, each of said elements including a magnetic structure having an air gap, and winding means for the magnetic structure, said winding means being effective when energized for establishing a shifting magnetic field in the air gap; said magnetic structures being positioned in a pair of spaced parallel first planes with said air gaps in alignment in a second plane transverse to the first planes, a rotor structure including an electroconductive armature mounted for rotation about an axis extending substantially transverse to the second plane relative to the magnetic structures through the aligned air gaps under the influence of the shifting fields, each of said first planes extending between front and rear areas of the meter, a pair of substantially U-shaped permanent magnets each having a pair of magnetically opposed poles for damping rotation of said armature, and a frame assembly securing said structures in said spaced relation, said frame assembly further supporting said magnets in the space between the magnetic structures in a pair of spaced parallel third planes transverse to said first planes with said opposed poles on a common side of the armature, said frame assembly including spaced portions closing the space between said structures at said front and rear areas, said structures and said frame assembly portions defining a closed loop surrounding said axis and said magnets, said frame assembly being formed of an electroconductive non-magnetic material.

5. In a multielement induction meter, a pair of electromagnetic elements, each of said elements including a magnetic structure having an air gap, and winding means for the magnetic structure, said winding means being effective when energized for establishing a shifting magnetic field in the air gap; said magnetic structures being positioned in a pair of spaced parallel first planes with said air gaps in alignment in a second plane transverse to the first planes, an electroconductive armature mounted for rotation about an axis extending substantially transverse to the second plane relative to the magnetic structures through the aligned air gaps under the influence of the shifting magnetic fields, said axis being located in the space between said magnetic structures, each of said first planes extending between front and rear areas of the meter, a pair of substantially U-shaped permanent magnets each having a pair of magnetically opposed poles for damping rotation of said armature, supporting frame means supporting said magnets in the space between the magnetic structures with the magnets in a pair of spaced parallel third planes transverse to said first planes with said opposed poles on a common side of the armature, said magnets being located in an area which is bounded by said magnetic structures and said frame means, said frame means being formed of an electroconductive non-magnetic material, adjustable light load adjusting means operating on one of said elements for controlling the light load response of the meter, adjustable phase balance adjusting means operating on the other of said elements for controlling the influence of said other of said elements upon the armature to provide substantially the same influence of said elements upon the armature for equal energizations of said elements, and separate actuable means effective when actuated for adjusting each of said adjusting means, each of said actuable means including an actuating portion located at said front area externally of the space between said structures.

References Cited in the file of this patent

UNITED STATES PATENTS

| | | |
|---|---|---|
| 1,913,260 | Batt | June 6, 1933 |
| 2,119,015 | Kurz | May 31, 1938 |
| 2,134,575 | Pratt | Oct. 25, 1938 |
| 2,160,416 | Green | May 30, 1939 |
| 2,167,649 | Green | Aug. 1, 1939 |
| 2,170,753 | Green | Aug. 22, 1939 |
| 2,243,130 | Sherwood | May 27, 1941 |
| 2,321,437 | Trekell | June 8, 1943 |
| 2,352,965 | Mendelsohn | July 4, 1944 |
| 2,832,048 | Kadri | Apr. 22, 1958 |

FOREIGN PATENTS

| | | |
|---|---|---|
| 594,892 | Germany | Mar. 23, 1934 |
| 587,339 | Great Britain | Apr. 22, 1947 |